United States Patent
Goss

(10) Patent No.: US 7,148,585 B2
(45) Date of Patent: Dec. 12, 2006

(54) POWER GRID BACKFEED PROTECTION APPARATUS

(75) Inventor: Milton E. Goss, Laurel, MD (US)

(73) Assignee: The Johns Hopkins University, Baltimore, MD (US)

( * ) Notice: Subject to any disclaimer, the term of this patent is extended or adjusted under 35 U.S.C. 154(b) by 369 days.

(21) Appl. No.: 10/343,726

(22) PCT Filed: Jul. 26, 2001

(86) PCT No.: PCT/US01/23543

§ 371 (c)(1),
(2), (4) Date: Jan. 31, 2003

(87) PCT Pub. No.: WO02/11263

PCT Pub. Date: Feb. 7, 2002

(65) Prior Publication Data

US 2004/0169972 A1    Sep. 2, 2004

Related U.S. Application Data

(60) Provisional application No. 60/222,459, filed on Aug. 2, 2000.

(51) Int. Cl.
*H02J 7/00* (2006.01)
*H02H 3/18* (2006.01)
*H02H 1/00* (2006.01)

(52) U.S. Cl. .................... 307/64; 307/65; 361/82; 361/114

(58) Field of Classification Search ............. 361/82, 361/84, 86, 87, 114, 115; 307/64–66, 67, 307/68, 76, 78, 80, 44
See application file for complete search history.

(56) References Cited

U.S. PATENT DOCUMENTS

| 3,495,197 A | | 2/1970 | Lietz ........................ 335/6 |
| 3,753,069 A | * | 8/1973 | Newton ................... 318/440 |
| 3,778,633 A | * | 12/1973 | DeVisser et al. .......... 307/64 |
| 3,859,589 A | * | 1/1975 | Rush ....................... 322/40 |
| 3,944,837 A | | 3/1976 | Meyers et al. ............ 290/40 |
| 4,797,567 A | | 1/1989 | Pappas .................... 307/66 |
| 5,055,702 A | | 10/1991 | Bhattacharya ............ 307/29 |
| 5,536,976 A | * | 7/1996 | Churchill ................. 307/11 |
| 6,100,604 A | * | 8/2000 | Morroni et al. .......... 307/64 |
| 6,141,634 A | * | 10/2000 | Flint et al. ............... 703/18 |
| 6,169,340 B1 | * | 1/2001 | Jones ...................... 307/64 |
| 6,285,178 B1 | * | 9/2001 | Ball et al. ............... 323/351 |
| 6,304,006 B1 | * | 10/2001 | Jungreis .................. 307/64 |
| 6,876,103 B1 | * | 4/2005 | Radusewicz et al. ...... 307/64 |

* cited by examiner

*Primary Examiner*—Brian Sircus
*Assistant Examiner*—Danny Nguyen
(74) *Attorney, Agent, or Firm*—Albert J. Fasulo, II

(57) ABSTRACT

A circuit breaker that functions like a double pole double throw (DPDT) switch is used to isolate the commercial power grid from an external power source. When in the "on" position the circuit breaker serves as a main power input circuit breaker allowing power from the commercial power grid to feed into existing wiring. In the "off" position the commercial power grid is disconnected and isolated from the existing wiring. Instead, the switch mechanism is connected to an external power source such as a generator. The generator can be safely operated without risking power backfeed into the commercial power grid.

1 Claim, 1 Drawing Sheet

POWER GRID BACKFEED PROTECTION APPARATUS

CROSS-REFERENCE TO RELATED APPLICATIONS

This application claims the benefit of prior filed co-pending U.S. Provisional Patent Application No. 60/222,459, filed on Aug. 2, 2000.

FIELD OF THE INVENTION

The present invention relates to an apparatus for preventing power backfeed into the commercial power grid when a generator is used to provide power in the event of a commercial power failure.

BACKGROUND OF THE INVENTION

It is a common occurrence to lose commercial power during violent thunderstorms, hurricanes, and earthquakes. When there is a commercial power failure, for whatever reason, customers sometimes utilize portable generators to run electricity into their homes until the commercial power can be restored. However, using a generator in a home wired for commercial power can be dangerous if all safety precautions are not followed. Unfortunately, many homeowners do not follow all of the safety precautions and simply plug their generators into an outlet in their home to supply power to the rest of the home. This causes a dangerous condition known as backfeed. Backfeed refers to unauthorized power feeding from a home or other building into the commercial power grid. This is extremely dangerous to the workers whose job it is to repair the commercial power grid. These workers do not expect there to be any power in the commercial power grid while they are working on it. Thus, the existence of power on the grid due to backfeed can seriously injure those whose job it is to repair the commercial power grid.

Homeowners that do follow the requisite safety precautions when using a portable generator must adhere to a rigorous protocol that includes specialized switching, transfer boxes, and separate wiring. These precautions are necessary to protect both the commercial power grid from backfeed and the homeowner's own electrical equipment.

What is needed is an apparatus that protects the commercial power grid from backfeed while eliminating the specialized equipment currently required to safely run a generator during a commercial power failure.

SUMMARY OF THE INVENTION

Presently, there are two ways to wire external power (e.g., a generator) into established wiring systems. One is to add external switching or transfer boxes. This is the safest, albeit, most complicated way. The second way is to jury rig a connection that risks backfeeding power into the commercial power grid. As described above, this is a potentially dangerous condition for those working to repair the commercial power grid. The present invention describes an apparatus that solves the backfeed problem while eliminating the need for specialized equipment.

The present invention is comprised of an apparatus designed to prevent power from backfeeding into a primary source of power such as a commercial power grid when a secondary source of power such as a generator is connected to existing wiring that is normally powered by the primary source of power.

The present invention includes a switching mechanism within a circuit breaker in which the switching mechanism is electrically connected with the existing wiring. The switching mechanism can be toggled between the primary source of power and the secondary source of power such that the primary source of power and the secondary source of power are always isolated from one another regardless of which source of power is currently feeding the existing wiring. This prevents the secondary source of power from backfeeding into said primary source of power and vice versa.

A circuit breaker that functions like a double pole double throw (DPDT) switch is used to isolate the commercial power grid from an external power source. When in the "on" position the circuit breaker serves as a main power input circuit breaker allowing power from the commercial power grid to feed into existing wiring. In the "off" position the commercial power grid is disconnected and isolated from the existing wiring. Instead, the switch mechanism is connected to an external power source such as a generator. The generator can be safely operated without risking power backfeed into the commercial power grid.

DESCRIPTION OF THE PREFERRED EMBODIMENTS

Figure 1:
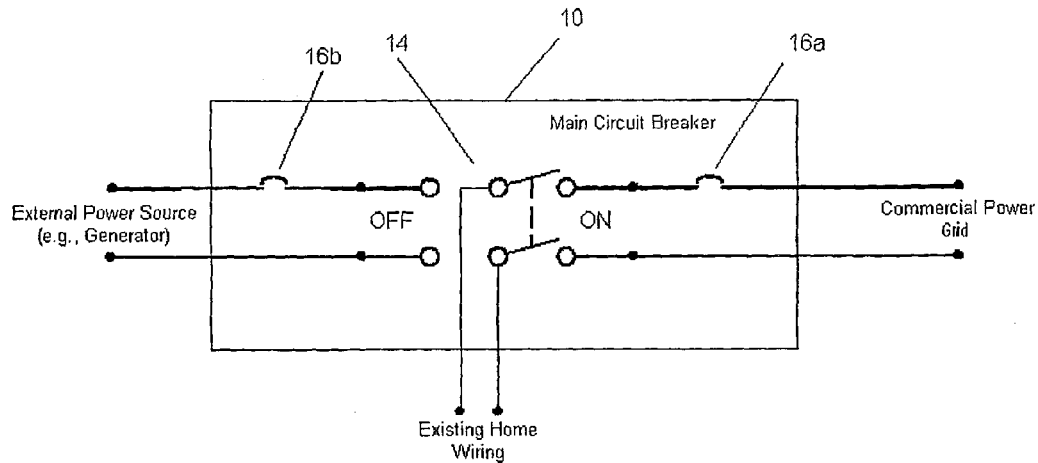
FIG. 1 illustrates a block diagram of the circuit breaker of the present invention.

The present invention is designed to be a replacement for currently existing main circuit breakers as illustrated in FIG. 1. As a result, the present invention can be rather easily and inexpensively retrofitted to existing homes.

A main circuit breaker 10 includes the functional equivalent of a double pole double throw (DPDT) switch 14. When switch 14 is in the "on" position (default) a normal connection with a primary source of power such as a commercial power grid is maintained. In the event of a commercial power failure, however, the homeowner can turn switch 14 to the "off" position thereby isolating the existing home wiring from the commercial power grid and establishing a connection with a secondary source of power such as a generator. Circuit breakers 16a and 16b are also included to protect the existing home wiring from a surge or other abnormal power condition that may occur in either the external power source or commercial power grid.

The circuit breaker 16a for the commercial power grid typically has a rating of 200 Amps. The circuit breaker for the external power source is likely rated much lower (approximately 30 Amps). This rating, however, can be tailored to suit the power output of the external power source.

Figure 2:
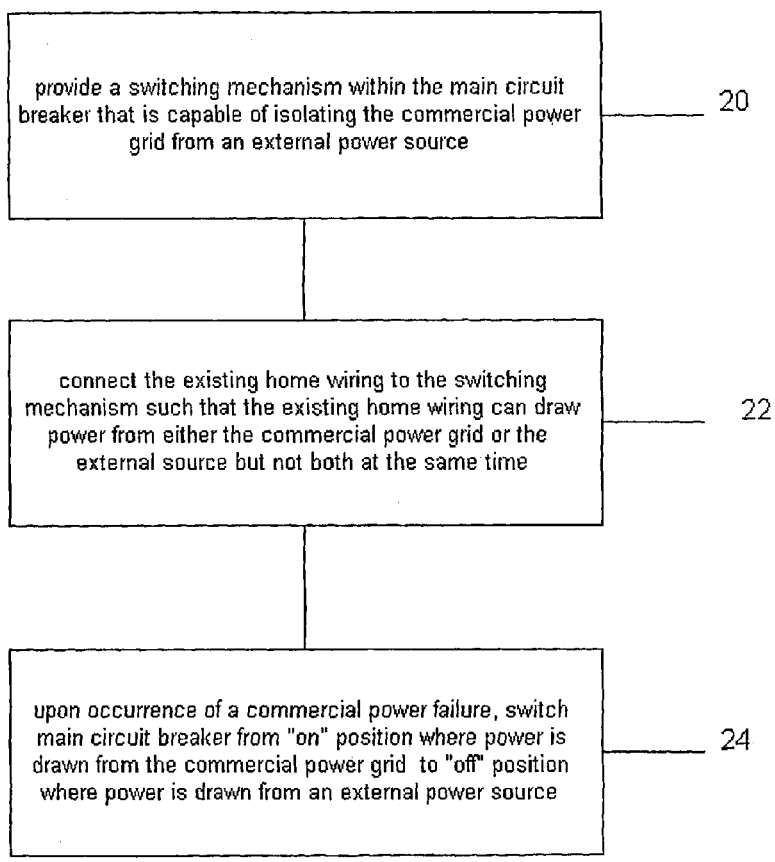
FIG. 2 illustrates a logic flow diagram describing the processes of the present invention.

FIG. 2 illustrates a logic flow diagram describing the processes of the present invention used to prevent a dangerous backfeed condition from occurring. A switching mechanism is provided 20 within the main circuit breaker that is capable of isolating a primary source of power such as the commercial power grid from a secondary source of power such as a generator. The existing home wiring is connected 22 to the switching mechanism such that the existing home wiring can draw power from either the commercial power grid or the external power source but not both at the same time. Upon occurrence of a commercial power failure, the main circuit breaker is switched 24 from the "on" position where power is drawn from the commercial power grid to the "off" position where power is drawn from an external power source.

In the following claims, any means-plus-function clauses are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

The invention claimed is:

1. An apparatus to prevent power from backfeeding into primary source of power when a secondary source of power is connected to existing wiring that is normally powered by said primary source of power, said apparatus comprising: a manual switching mechanism electrically connected with said existing wiring, a first circuit breaker connected between the manual switching mechanism and the primary source, a second circuit breaker connected to between the manual switching mechanism and the secondary source, said switching mechanism able to be toggled under manual control between said primary source of power and said secondary source of power such that said primary source of power and said secondary source of power, and said first circuit breaker and second circuit breaker, are always isolated from one another regardless of which source of power is currently feeding said existing wiring thereby preventing said primary source of power from backfeeding into said secondary source of power and preventing said secondary source of power from backfeeding into said primary source of power, wherein the existing wiring is home wiring, the primary source of power is a commercial power grid, and the secondary source of power is a generator, wherein said first circuit breaker has a rating of approximately of 200 Amps, wherein said second circuit breaker has a rating of approximately of 30 Amps, and wherein the switching mechanism includes a manually operated double pole double throw switch configured to be toggled between a first position that connects the existing wiring to the primary source and a second position that connects the existing wire to the secondary source.

* * * * *